(12) United States Patent
Thomlinson et al.

(10) Patent No.: US 7,876,902 B2
(45) Date of Patent: Jan. 25, 2011

(54) DISTRIBUTION OF ENCRYPTED SOFTWARE UPDATE TO REDUCE ATTACK WINDOW

(75) Inventors: Matthew W. Thomlinson, Seattle, WA (US); Christian E. Walker, Bainbridge, WA (US)

(73) Assignee: Microsoft Corporation, Redmond, WA (US)

( * ) Notice: Subject to any disclaimer, the term of this patent is extended or adjusted under 35 U.S.C. 154(b) by 911 days.

(21) Appl. No.: 11/515,439

(22) Filed: Aug. 31, 2006

(65) Prior Publication Data

US 2008/0072327 A1     Mar. 20, 2008

(51) Int. Cl.
*H04L 9/08* (2006.01)
*H04L 9/00* (2006.01)
*G06F 11/00* (2006.01)

(52) U.S. Cl. .................... 380/278; 380/277; 726/25; 726/26

(58) Field of Classification Search .................... 380/44, 380/264, 273, 277, 278, 279, 280, 286; 713/153, 713/154, 162, 189, 190, 191, 194; 726/22, 726/25, 26, 27, 28, 29, 30, 31
See application file for complete search history.

(56) References Cited

U.S. PATENT DOCUMENTS

| | | | | |
|---|---|---|---|---|
| 5,894,516 | A * | 4/1999 | Brandenburg | 705/51 |
| 6,199,204 | B1 * | 3/2001 | Donohue | 717/178 |
| 6,862,581 | B1 * | 3/2005 | Lambiase | 705/51 |
| 6,928,167 | B1 * | 8/2005 | Maeda et al. | 380/285 |
| 6,976,251 | B2 * | 12/2005 | Meyerson | 717/173 |
| 7,127,067 | B1 * | 10/2006 | Wachtler et al. | 380/255 |
| 7,774,774 | B1 * | 8/2010 | Mulligan et al. | 717/174 |
| 2004/0003266 | A1 * | 1/2004 | Moshir et al. | 713/191 |
| 2004/0125954 | A1 * | 7/2004 | Riebe et al. | 380/231 |
| 2005/0256664 | A1 * | 11/2005 | Blumfield et al. | 702/121 |
| 2006/0059337 | A1 * | 3/2006 | Poyhonen et al. | 713/165 |
| 2006/0075001 | A1 * | 4/2006 | Canning et al. | 707/203 |
| 2006/0080656 | A1 * | 4/2006 | Cain et al. | 717/174 |
| 2007/0107059 | A1 * | 5/2007 | Chasin et al. | 726/23 |
| 2007/0130084 | A1 * | 6/2007 | Kay et al. | 705/67 |

OTHER PUBLICATIONS

Bashar, M.A.; Krishnan, G.; Kuhn, M.G.; Spafford, E.H.; Wagstaff, S.S., Jr., "Low-threat security patches and tools," Software Maintenance, 1997. Proceedings., International Conference on , vol., No., pp. 306-313, Oct. 1-3, 1997 URL: http://ieeexplore.ieee.org/stamp/stamp.jsp?arnumber=624263&isnumber=13575.*

(Continued)

*Primary Examiner*—Michael Pyzocha
*Assistant Examiner*—Hilary Branske
(74) *Attorney, Agent, or Firm*—Woodcock Washburn LLP

(57) ABSTRACT

Software updates remedy vulnerabilities in a computer program that has been distributed and installed on a plurality of computers. The software updates are distributed in encrypted form, and then, after the encrypted update has been delivered to a sufficient number of machines, the decryption key for the update is delivered. Since the key is relatively small, it can be distributed to a large number of machines very quickly, thereby reducing the amount of time between when the update is first known to the public, and the time at which all or most machines have installed the update to protect against the vulnerability.

19 Claims, 3 Drawing Sheets

OTHER PUBLICATIONS

H Johansen, D Johansen, 2006, FirePatch. Secure and time-critical dissemination of patches, Universitetet i Tromsø.*

Stoll, C., "Telling the goodguys: disseminating information on security holes," Aerospace Computer Security Applications Conference, 1988., Fourth , vol., No., pp. 216-218, Dec. 12-16, 1988 URL: http://ieeexplore.ieee.org/stamp/stamp.jsp?arnumber=113444&isnumber=3362.*

Addington, Bill, "Slow down the security patch cycle," Computerworld, May 3, 2004, URL: http://www.computerworld.com/s/article/print/92037/Slow_down_the_security_patch_cycle.*

Beattie, et al., Timing the Application of Security Patches for Optimal Uptime. In Proceedings of the 16th USENIX Conference on System Administration (Philadelphia, PA, Nov. 3-8, 2002). System Administration Conference. USENIX Association, Berkeley, CA, 233-242.*

Galvin, J. M. 1996. Public Key distribution with secure DNS. In Proceedings of the 6th Conference on USENIX Security Symposium, Focusing on Applications of Cryptography—vol. 6 (San Jose, California, Jul. 22-25, 1996). USENIX Security Symposium. USENIX Association, Berkeley, CA, 16-16.*

Jones et al. Layering Public Key Distribution Over Secure DNS using Authenticated Delegation. In Proceedings of the 21st Annual Computer Security Applications Conference (Dec. 5-9, 2005). ACSAC. IEEE Computer Society, Washington, DC, 409-418.*

* cited by examiner

DISTRIBUTION OF ENCRYPTED SOFTWARE UPDATE TO REDUCE ATTACK WINDOW

BACKGROUND OF THE INVENTION

Computer programs are complex systems, and they typically have vulnerabilities that are not discovered until after the software is released. These vulnerabilities can be addressed after the initial software is released by distributing and installing an update to the software, which is designed to remedy, or protect against, the vulnerability. Typically, the vulnerability is discovered by the program's manufacturer, support entity, or partner before the vulnerability is generally known to the public.

One problem with an update is that the update can normally be reverse engineered to reveal the existence of the vulnerability that the update is attempting to fix, which can be an invitation to attackers to try to exploit the vulnerability on machines without the fix applied. If updates could be delivered to every machine at the same time, then the fact that the updates reveals the vulnerability would not be a significant problem, since all machines would be protected against the vulnerability at the same time that attackers learned of the vulnerability's existence. However, updates often take the form of large files, and there is not sufficient bandwidth, or other physical resources, to distribute the update to every machine at the same time. Thus, there is a window of time during which the update (and the vulnerability that it both fixes and reveals) is known to the public, but a significant number of machines are unprotected. It is desirable to update programs in such a manner that all, or a large number, of machines are protected very soon after the update is first made known to the public.

SUMMARY OF THE INVENTION

Updates can be provided in an encrypted form, such that being able to use the update (or to read it for reverse engineering purposes) requires a decryption key. The key can then be delivered after certain conditions have been met—e.g., only after the encrypted update has been delivered to a sufficient number of machines to ensure widespread protection, and/or after the update has undergone sufficient testing to ensure that it effectively remedies the vulnerability that it is designed to address. Since the key is small the key can be delivered to a large number of machines in a relatively short amount of time, as compared with how long it takes to distribute the update itself. Once the key is received by the machines on which the update is to be installed, the update, which has already been delivered in encrypted form, can be decrypted and installed. Since the update is encrypted, the update can be presumed not to be known to the world until the key is delivered. And, since the widespread distribution of the key takes a relatively short amount of time, the amount of time between when the update is first known, and the time at which a large number of machines are protected, is reduced, as compared with the time period that would exist if updates were distributed in unencrypted form.

In one example, a method of updating a computer program comprises: distributing, to a plurality of computers, a first patch in an encrypted form decryptable with a first key, wherein the first patch prevents use of a first vulnerability in the computer program, and wherein said first patch reveals the existence of said first vulnerability; determining that one or more criteria have been met; and distributing said first key to the plurality of computers after determination that the one or more criteria have been met.

Other features are described below.

DETAILED DESCRIPTION

Overview

Figure 1:
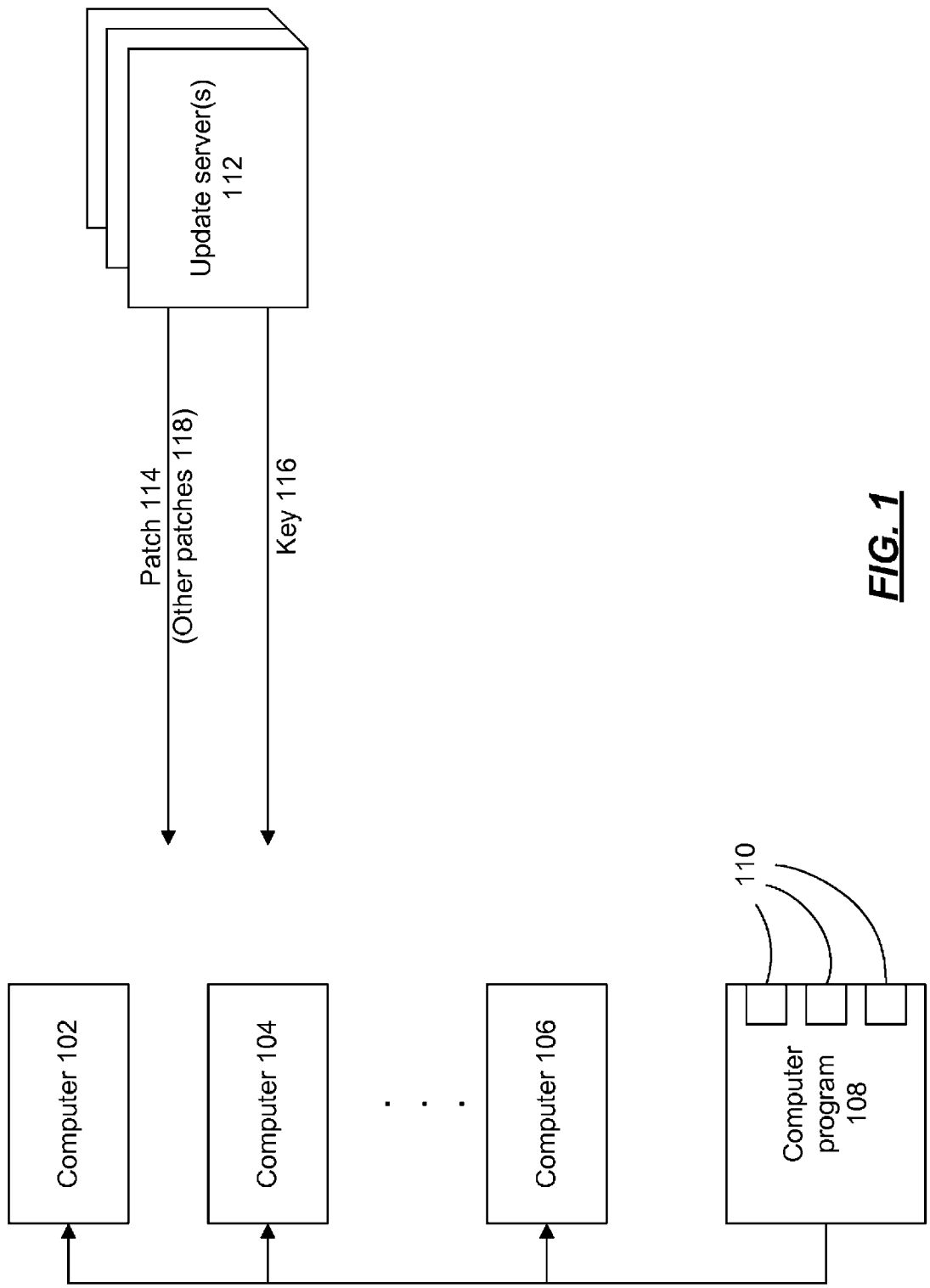
FIG. 1 is a block diagram of an example update server that distributes a patch and a key.

Software updates (sometimes referred to as "patches") are used to provide improvements to existing deployed software. The Microsoft Update feature used with the MICROSOFT WINDOWS operating systems is an example of a system for delivering software updates. In some cases, the update is used to prevent exploitation of a vulnerability that has been discovered in the original software. It is beneficial to deliver software updates quickly and widely to protect our customers—i.e., to make sure that a large percentage of machines receive the update in a relatively short amount of time from when the update first begins to be deployed.

Achieving both quick and wide distribution of updates is handled by massive scaling of the single distribution point. The size, number of updates, and number of machines to be updated requires a very large scale distribution point, and in some cases may reach the physical limits of the distribution method (e.g., the number of servers available, or the bandwidth of the network connection, may lack excess capacity to deliver updates to more machines in the same or smaller period of time). In many cases, it takes the entity that distributes the updates several days or a week or more to distribute updates to customers, using all of the available bandwidth of the distributing entity and the idle bandwidth of the customers.

A problem with performing updates over a period of time as long as days or a week is this. In many cases, the update reveals the vulnerability that the update is designed to fix. Often, the vulnerability is discovered by the manufacturer of the software and is not known to the general public, but the act of publishing the update simultaneously publishes the vulnerability to the world. Thus, from the moment that the process of distributing an update starts, the update is available to would-be attackers, who begin reverse engineering the update to discover the weaknesses and write exploits based on the weakness. A financial gain motivates would-be attackers to do this ever faster in order to affect the largest number of still-not-updated machines. Thus, the time between when the update is first distributed, and the time at which a large percentage of machines has received it, is a critical time during which attackers can exploit the vulnerability that the update both fixes and reveals.

For example, in the case of the Zotob in August 2005 (a worm that exploited a vulnerability in the MICROSOFT WINDOWS operating systems), the time between update release and first exploit was less than five days. This "window of safety" from update release to first exploit continues to shrink and tools exist now to make this window of safety much shorter than the time necessary to centrally distribute updates.

A solution is to distribute software updates blinded. For example, instead of distributing updates in the clear, updates can be distributed in the form of symmetric-encrypted binaries to machines at a leisurely pace. Once a large majority of machines have received the update, the key to decrypt the update is broadcast publicly and defenders and attackers start the race together. The key can be distributed to a large number of machines relatively fast; since the size of the key is small relative to the size of the update, distributing the key does not stress the physical limits of the update system in the same way as distributing the update does. Using this method, the defender is no longer at the mercy of the bandwidth of the distribution channel in order to be protected.

Key distribution could be done centrally (e.g., via the update service itself, such as via Microsoft's update service), or the keys (which are relatively small) could be done via a fast, ubiquitous mechanism like the Domain Name System (DNS), where the machines' update service tries to resolve an DNS address at some frequency (e.g., once per hour), until the address resolves. If the string received from a DNS server is the correct key (e.g., if the update decrypts and the signature validates) then the update is installed. This type of encryption can be done without affecting the existing infrastructure to compress and sign the update, since the encryption can be applies to the outermost layer.

Each update would have a symmetric key associated therewith which would need to be disclosed. Associating a particular symmetric key with a particular update allows selective distribution such that if an update was in the process of being distributed and found to be problematic, it could be delayed to the next update cycle simply by not distributing its key (and writing an improved update that would be distributed later). That is, even if the update was distributed, no information about the fix would need to be disclosed.

Distribution of Update and Key

Referring to FIG. 1, there is shown a scenario in which an encrypted patch and a key are to be distributed. A computer program 108 is installed on a plurality of computers. In the example of FIG. 1, three such computers 102, 104, and 106 are shown, although computer program 108 may be installed on any number of computers. For example, computer program may be an operating system that is installed on millions of computers. Computer program 108 has one or more vulnerabilities 110. A vulnerability is an opportunity that could be used to either breach the security of computer program 108, or that of the computer on which computer program 108 is operating on. Or, a vulnerability could be simply an opportunity for someone to cause computer program 108 to behave in an unexpected manner. The Zotob August 2005 worm mentioned above, for example, exploited a vulnerability in the Windows Plug-and-Play service. The nature of complex software is that even the best, most thoroughly tested, commercial-quality programs will have certain vulnerabilities that are discovered only after the software is released, and that can be fixed by a subsequent patch. Vulnerabilities may be discovered throughout the life cycle of a program because of new testing techniques, unanticipated customer scenarios, or other reasons.

Update server(s) 112 are a computer (or a cluster of plural computers) that distributed patches 114 to computers 102, 104, and 106. Patch 114 remedies one or more of the vulnerabilities 110, by preventing (or, at least, resisting) exploitation of the vulnerabilities. Patch 114 is distributed in encrypted form, so as to be decryptable by a key 116. Update server(s) 112 may also distribute other patches 118; each such patch may be decryptable by a different key.

One aspect of patch 114 is that it may reveal the existence of the one or more vulnerabilities 110 that the patch is attempting to remedy.

By distributing patch 114 in encrypted form and then releasing the decryption key 116 for that patch after all (or some defined large proportion) of computers have received the patch, it is possible to ensure that a large number of computers will receive the protection of the patch at essentially the same time (or within the relatively short space of time that it takes to distribute the key). Thus, the fact that the patch may reveal an underlying vulnerability in the computer program does not provide much opportunity for an attacker to exploit the vulnerability and attack un-patched computers.

As noted above, update server(s) 112 may distribute both patch 114 and other patches 118. In one example, plural patches are distributed in encrypted form, but the decryption key is ultimately distributed for only one of the patches. Thus, it may be possible for developers to create several patches and distribute them as bandwidth allows, while delaying the decision as to which patch will actually be decrypted and used. Thus, the key can simply be withheld for patches that the software developer decides not to distribute. Or, the developers may be testing a patch and ultimately decide whether or not to release the key for that patch, based on whether the patch can be determined to provide some requisite level of protection against one or more specified vulnerabilities.

The servers 112 shown in FIG. 1 are implemented on computers. It should be noted that FIG. 1 shows a cluster of one or more servers, and that the same cluster of servers is shown as distributing both the encrypted patch and the key. It should be noted that it may be the case that server(s) in the cluster each perform the function of distributing both the key and the patch; or, it can be the case that a given machine is dedicated to distributing either the key or the patch. The notion of one or more computers that distribute a patch and a key can include the case in which some computers are dedicated to distributing the patch or the key, and can also including the case in which any of the computers could distribute both the patch and the key.

Figure 2:
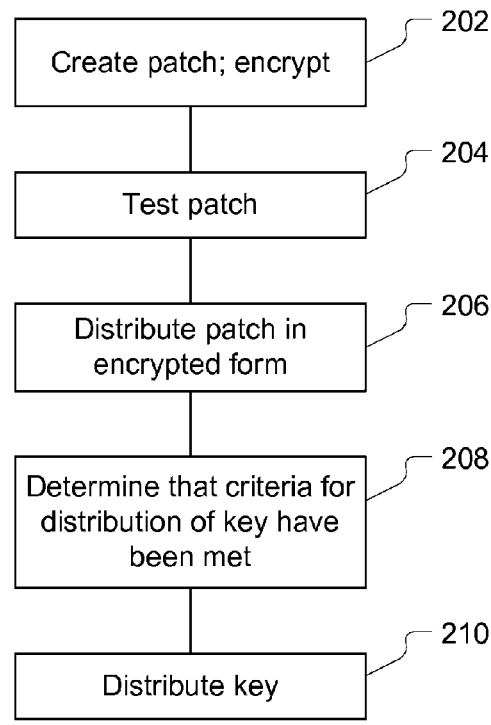
FIG. 2 is a flow diagram of an example process for distributing a patch and a key.

FIG. 2 is a flow diagram of a process whereby patches are created and distributed. At 202, a patch is created and encrypted. Creating the patch may take the form of software developers identifying a vulnerability in a computer program and writing code that prevents (or at least resists) exploitation of that vulnerability. The patch is then encrypted. Typically, the encryption is symmetric, such that the same key used to encrypt the patch is also the key that will be distributed and used to decrypt the patch.

At 204, the patch is tested. Such testing may be used to determine whether the patch adequately protects the program against the vulnerabilities that the patch is designed to address.

At 206, the patch is distributed. For example, the patch may be distributed to computers via the Internet, during the time that the receiving computers' Internet connections are idle. The distribution of the patch may occur during the time that the patch is being tested (see 206 above). In this way, the patch can be distributed early before full testing has taken place, and if the testing reveals a problem, the distribution can essentially be aborted by simply not releasing the key for the patch.

At 208, it is determined that one or more criteria for releasing the patch and distributing its key have been met. For example, these criteria may include:

That the patch has been determined to protect against a particular vulnerability, or against some set of vulnerabilities That the encrypted version of the patch has already been distributed to some defined number of computers, or to some defined proportion of computers. Ensuring distribution to some defined number or proportion of computers can ensure that a sufficient number of computers will be protected at the time the key is released, thereby making it unlikely that an attacker could launch a significant attack on many machines merely by using the vulnerability that the patch reveals.

At 210, after it has been determined that the one or more criteria have been met, the key is distributed, thereby allowing the patch to be decrypted and installed on the computers to which the encrypted patch has been distributed.

Figure 3:
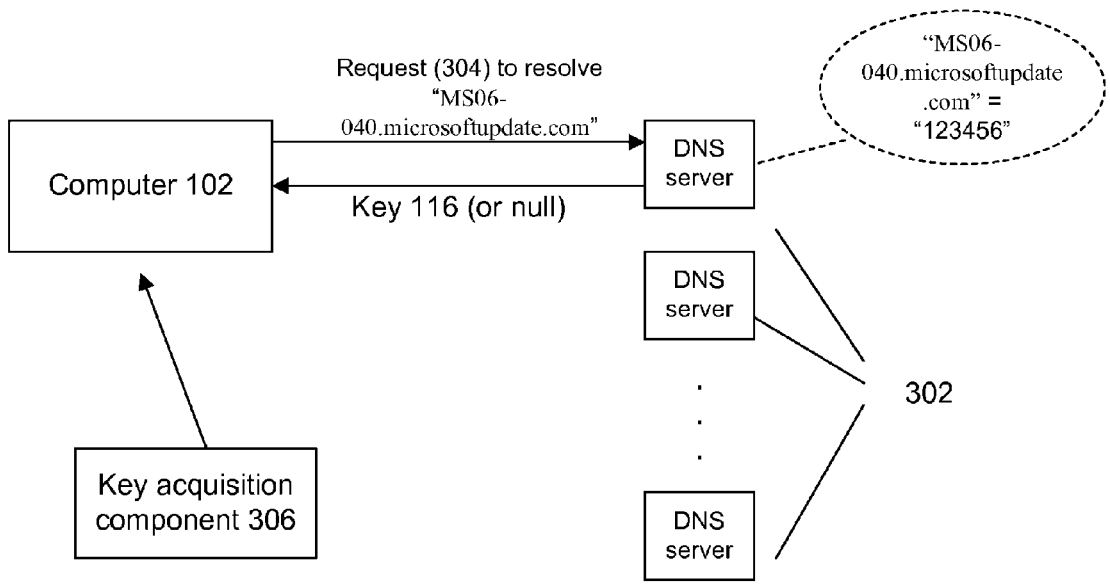
FIG. 3 is a block diagram of an example use of one or more domain name servers to distribute a key.

FIG. 3 shows a way of distributing a key to a patch. The Domain Name System (DNS) includes a plurality of servers 302, which are used to associate numeric addresses with domain names. Computers on the network that need to determine what numeric address is associate with a particular domain name (i.e., to "resolve" the domain name) can contact the server and request that the server look up a particular domain name. Typically, the lookup results in a numeric address for a particular host, although what the DNS servers actually do is simply to associate a number with a name; the computer that receives the result of the lookup then processes the number as a network address in order to contact a particular host. However, DNS can, more generally, be used simply to associate a name with a number. Additionally, DNS is effective at propagating these associations throughout the system fairly quickly.

In one example, DNS is used to associate a particular name (e.g., "MS06-040.microsoftupdate.com") with the key, at the time that the key is distributed. Thus, when the key has not been distributed, the name "MS06-040.microsoftupdate.com" may resolve to the null string. However, when the provider of the patch is ready to release the key, the patch provider associates the key with the name "MS06-040.microsoftupdate.com", and propagates this association throughout DNS. Thus, in the example shown, the key to be released is "123456", and the DNS servers contain an association between the name "MS06-040.microsoftupdate.com" and the number "123456".

A computer to which the encrypted patch has been distributed (e.g., computer 102), has installed thereon a key acquisition component 306, which may be software, a script, or the like, which instructs the computer to contact a DNS server periodically (e.g., every hour) in order to attempt to resolve the name "MS06-040. microsoftupdate.com", and to use the result as a key to decrypt the patch if the result is not null. Thus, under the direction of the key acquisition component 306, computer 102 makes a request 304 to one or more DNS servers 302 to resolve a particular name, such as "MS06-040.microsoftupdate.com". The DNS server(s) then return either an actual key 116, or a null value, depending on whether a value is associated with the name "MS06-040. microsoftupdate.com" in the DNS system.

Example Computing Environment

Figure 4:
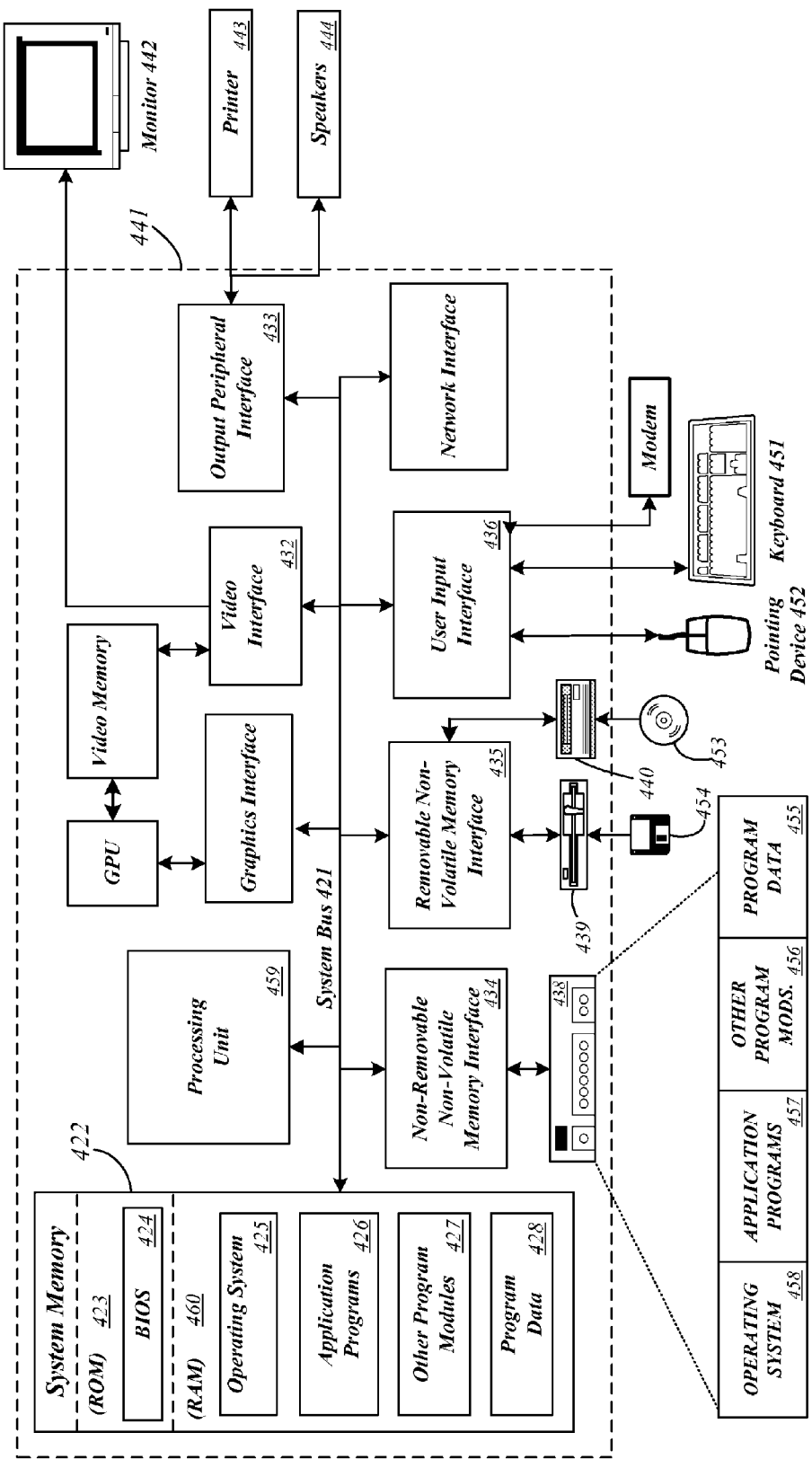
FIG. 4 is a block diagram of an example computing environment in which aspects of the subject matter described herein may be implemented.

Referring to FIG. 4, shown is a block diagram representing an example computing device. The computing system environment 420 is only one example of a suitable computing environment and is not intended to suggest any limitation as to the scope of use or functionality of the subject matter disclosed herein. Neither should the computing environment 420 be interpreted as having any dependency or requirement relating to any one or combination of components illustrated in the example operating environment 420.

Aspects of the subject matter described herein are operational with numerous other general purpose or special purpose computing system environments or configurations. Examples of well known computing systems, environments, and/or configurations that may be suitable for use with the subject matter described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

An example system for implementing aspects of the subject matter described herein includes a general purpose computing device in the form of a computer 441. Components of computer 441 may include, but are not limited to, a processing unit 459, a system memory 422, and a system bus 421 that couples various system components including the system memory to the processing unit 459. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 441 typically includes a variety of computer readable media. Computer readable media can be any available media that can be accessed by computer 441 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 441. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 422 includes computer storage media in the form of volatile and/or nonvolatile memory such as read only memory (ROM) 423 and random access memory (RAM) 460. A basic input/output system 424 (BIOS), containing the basic routines that help to transfer information between elements within computer 441, such as during start-up, is typically stored in ROM 423. RAM 460 typically contains data and/or program modules that are immediately accessible to and/or presently being operated on (by processing unit 459. By way of example, and not limitation, FIG. 4 illustrates operating system 425, application programs 426, other program modules 427, and program data 428.

The computer 441 may also include other removable/non-removable, volatile/nonvolatile computer storage media. By way of example only, FIG. 4 illustrates a hard disk drive 438 that reads from or writes to non-removable, nonvolatile magnetic media, a magnetic disk drive 439 that reads from or writes to a removable, nonvolatile magnetic disk 454, and an optical disk drive 440 that reads from or writes to a removable, nonvolatile optical disk 453 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 438 is typically connected to the system bus 421 through a non-removable memory interface such as interface 434, and magnetic disk drive 439 and optical disk drive 440 are typically connected to the system bus 421 by a removable memory interface, such as interface 435.

The drives and their associated computer storage media discussed above and illustrated in FIG. 4, provide storage of computer readable instructions, data structures, program modules and other data for the computer 441. In FIG. 4, for example, hard disk drive 438 is illustrated as storing operating system 458, application programs 457, other program modules 456, and program data 455. Note that these components can either be the same as or different from operating system 425, application programs 426, other program modules 427, and program data 428. Operating system 458, application programs 457, other program modules 456, and program data 455 are given different numbers here to illustrate that, at a minimum, they are different copies. A user may enter commands and information into the computer 441 through input devices such as a keyboard 451 and pointing device 452, commonly referred to as a mouse, trackball or touch pad. Other input devices (not shown) may include a microphone, joystick, game pad, satellite dish, scanner, or the like. These and other input devices are often connected to the processing unit 459 through a user input interface 436 that is coupled to the system bus, but may be connected by other interface and bus structures, such as a parallel port, game port or a universal serial bus (USB). A monitor 442 or other type of display device is also connected to the system bus 421 via an interface, such as a video interface 432. In addition to the monitor, computers may also include other peripheral output devices such as speakers 444 and printer 443, which may be connected through an output peripheral interface 433.

It should be understood that the various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computer systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of updating a computer program that is installed on a plurality of computers, the method comprising:

distributing, to the plurality of computers, a first patch in an encrypted form decryptable with a first key, wherein said first patch prevents use of a first vulnerability in the computer program, and wherein said first patch in an unencrypted form reveals the existence of said first vulnerability;

determining that one or more criteria have been met for installing the first patch; and after determination that said one or more criteria have been met, distributing said first key to the plurality of computers to decrypt the first patch, wherein distributing comprises:

associating the first key with a domain name corresponding to the first patch via at least one domain name server; and deploying a component on each of the plurality of computers which causes the computers to automatically periodically contact the at least one domain name server to resolve the domain name corresponding to the first patch and obtain said first key to decrypt the first patch.

2. The method of claim 1, wherein the one or more criteria comprise that said first patch has been distributed to a predetermined number or proportion of the plurality of computers.

3. The method of claim 1, wherein the one or more criteria comprise said first patch having been demonstrated to provide a requisite level of protection against either said first vulnerability or against one or more other vulnerabilities.

4. The method of claim 1, wherein the one or more criteria comprise said first patch having been demonstrated to provide a requisite level of protection against said first vulnerability.

5. The method of claim 1, further comprising:
testing said first patch during the time that said distributing of said first patch is occurring.

6. The method of claim 1, further comprising:
distributing, to the plurality of computers, a second patch in an encrypted form decryptable with a second key; and
withholding said second key from the plurality of computers.

7. The method of claim 1, wherein said distributing of said first key comprises:
propagating said domain name and the associated first key through a network of domain name servers.

8. A system for updating a computer program that is installed on a plurality of first computers, the system comprising:
one or more second computers that distribute, to the plurality of first computers, a first patch in an encrypted form decryptable with a first key, that determine whether one or more criteria have been met, and that upon determining that said one or more criteria have been met, distribute said first key to the plurality of first computers by (i) associating the first key with a domain name corresponding to the first patch via at least one domain name server, and (ii) deploying a component on each of the plurality of first computers which causes the first computers to automatically periodically contact the at least one domain name server to resolve the domain name corresponding to the first patch and obtain said first key to decrypt the first patch,
wherein said first patch prevents use of a first vulnerability in the computer program, and wherein the first patch in an unencrypted form reveals the existence of said first vulnerability.

9. The system of claim 8, wherein the one or more criteria comprise that said first patch has been distributed to a pre-determined number or proportion of the plurality of first computers.

10. The system of claim 8, wherein the one or more criteria comprise said first patch having been demonstrated to provide a requisite level of protection against either said first vulnerability or against one or more other vulnerabilities.

11. The system of claim 8, wherein the one or more criteria comprise said first patch having been demonstrated to provide a requisite level of protection against said first vulnerability.

12. The system of claim 8, wherein the one or more second computers distribute, to the plurality of first computers, a second patch in an encrypted form decryptable with a second key that is not distributed to the plurality of first computers.

13. The system of claim 8, wherein said one or more second computers propagate said first key through a network of domain name servers.

14. One or more computer-readable storage media, wherein a computer-readable medium is not a signal, the one or more computer-readable media encoded with executable instructions to perform a method of updating a computer program that is installed on a plurality of computers, the method comprising:
distributing, to the plurality of computers, a first patch in an encrypted form decryptable with a first key, wherein said first patch prevents use of a first vulnerability in the computer program, and wherein said first patch in an unencrypted form reveals the existence of said first vulnerability;
determining that one or more criteria have been met for installing the first patch; and
after determination that said one or more criteria have been met, distributing said first key to the plurality of computers to decrypt the first patch, wherein distributing comprises:
associating the first key with a domain name corresponding to the first patch via at least one domain name server; and
deploying a component on each of the plurality of computers which causes the computers to automatically periodically contact the at least one domain name server to resolve the domain name corresponding to the first patch and obtain said first key to decrypt the first patch.

15. The one or more computer-readable media of claim 14, wherein the one or more criteria comprise that said first patch has been distributed to a pre-determined number or proportion of the plurality of computers.

16. The one or more computer-readable media of claim 14, wherein the one or more criteria comprise said first patch having been demonstrated to provide a requisite level of protection against either said first vulnerability or against one or more other vulnerabilities.

17. The one or more computer-readable media of claim 14, wherein the one or more criteria comprise said first patch having been demonstrated to provide a requisite level of protection against said first vulnerability.

18. The one or more computer-readable media of claim 14, wherein the method further comprises:
distributing, to the plurality of computers, a second patch in an encrypted form decryptable with a second key; and
withholding said second key from the plurality of computers.

19. The one or more computer-readable media of claim 14, wherein said distributing of said first key comprises:
propagating said domain name and the associated first key through a network of domain name servers.

* * * * *